1,123,899.
Patented Jan. 5, 1915.
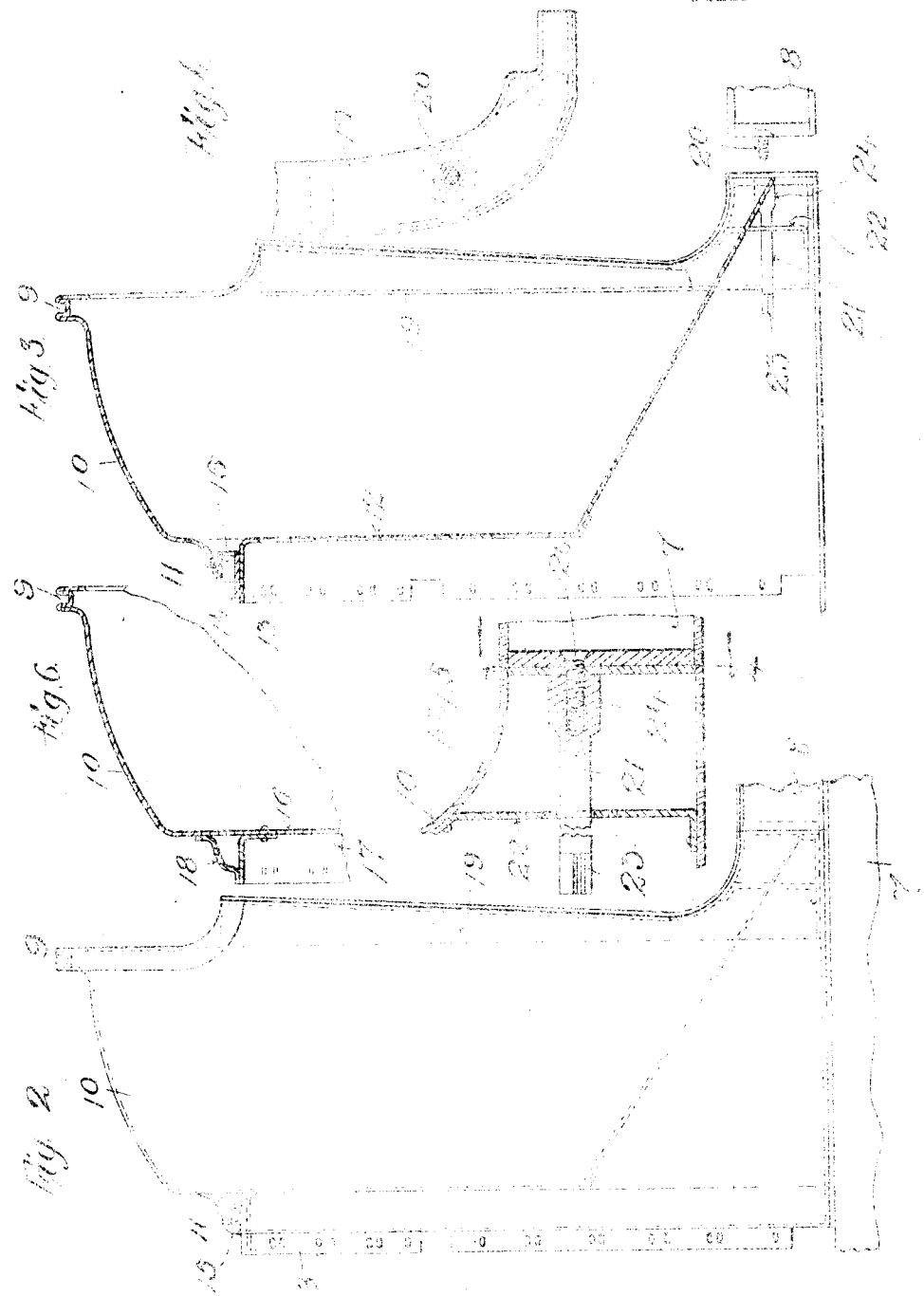

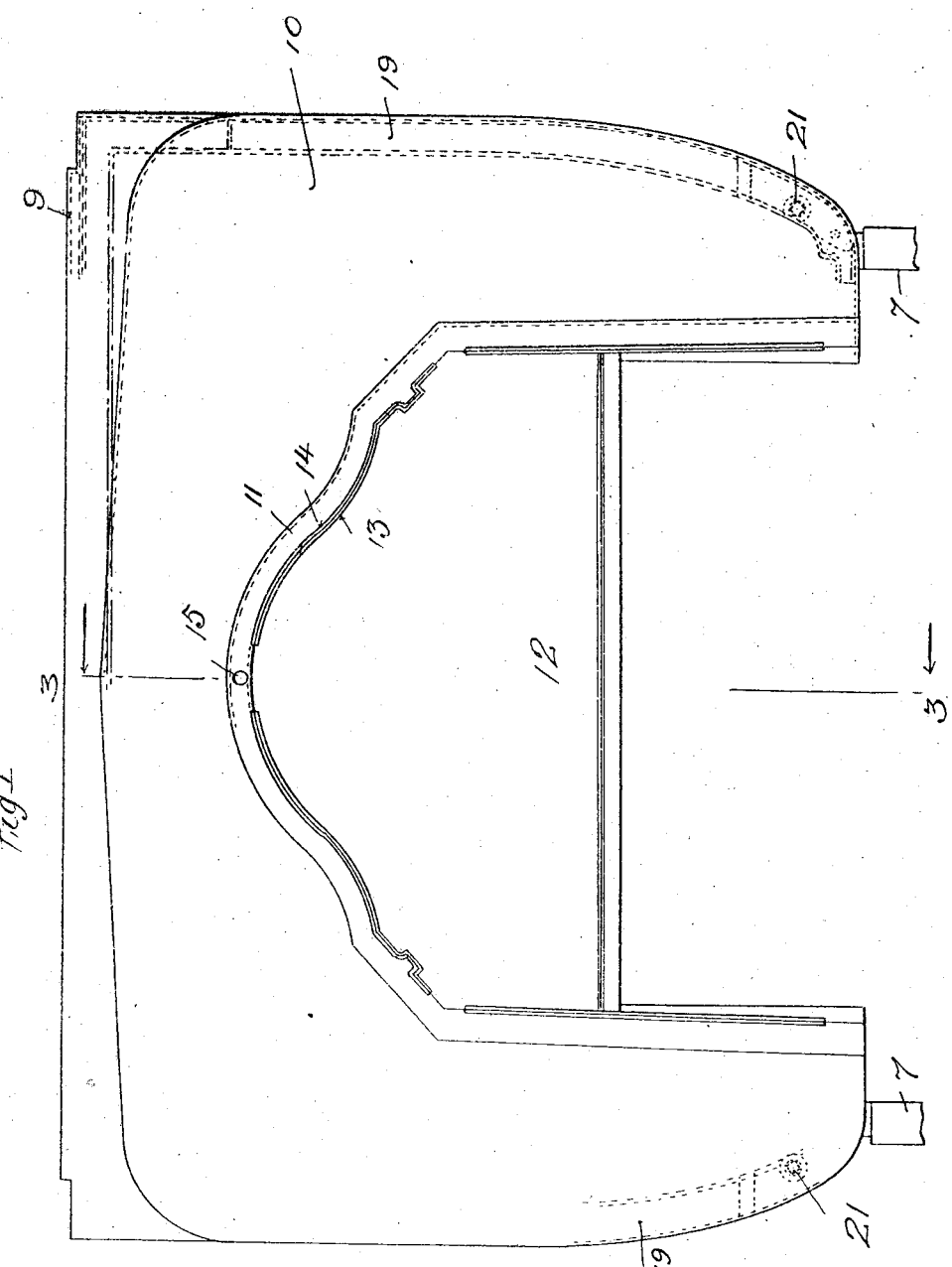

UNITED STATES PATENT OFFICE.

JOSEPH LEDWINKA, OF PHILADELPHIA, PENNSYLVANIA.

COWL STRUCTURE FOR AUTOMOBILES.

1,123,899.　　　　Specification of Letters Patent.　　Patented Jan. 5, 1915.

Application filed February 25, 1913. Serial No. 750,527.

*To all whom it may concern:*

Be it known that I, JOSEPH LEDWINKA, a citizen of the United States, residing at Philadelphia, in the county of Philadelphia, State of Pennsylvania, have made a certain new and useful Invention in Cowl Structures for Automobiles, of which the following is a specification.

This invention relates to cowl structures for automobiles.

The object of the invention is to provide a cowl for automobiles which is simple in construction, strong, durable and easily and cheaply made.

A further object is to provide a cowl which is of uniform shape and design, and which may be pressed or formed out of sheet metal.

A further object is to provide means which are easily accessible for securing a detachable body to the cowl, the latter carrying the steering wheel bearing, the engine control attachments, the oil drips, speed meter or indicator, clock and the like, in such manner as to enable the body to be detached, removed and replaced without disturbing said accessories and so as to always secure absolute uniformity and relation of the cowl and body.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the accompanying drawings and to the various views and reference numerals appearing thereon, Figure 1 is a view in front elevation parts broken off, of a cowl embodying the principles of my invention. Fig. 2, is a view in side elevation of the same, the body and chassis being broken off. Fig. 3 is a view in vertical central section on the line 3, 3, Fig. 1, looking in the direction of the arrows, the portion of the body shown being detached from the cowl. Fig. 4 is a broken detail view in section on the line 4, 4, Fig. 5, looking in the direction of the arrows. Fig. 5 is a similar view showing the manner of detachably securing the body to the cowl. Fig. 6 is a broken view in section similar to Fig. 3, showing a slightly modified arrangement embraced within the scope of my invention.

The same part is designated by the same reference numeral wherever it occurs throughout the several views.

In the manufacture of automobiles it is desirable to make the body detachable from the chassis so that it may be removed or replaced. It is also desirable to avoid disturbing the engine connections which are manipulated from the inside of the body when the latter is in place. It is therefore customary to secure the cowl permanently or fixedly upon the chassis and to support the steering wheel bearings, the oil drip, the speed indicator and other accessories as well as the engine control connections, upon the cowl. This not only requires a strong, durable and efficient cowl structure but it makes it necessary that when the body is replaced after being detached it be adjusted into absolutely the same uniform relation to the cowl which it occupied before it was removed. My invention is especially directed to the attainment of these and other objects and purposes.

In carrying out my invention I propose to form the cowl of sheet metal, preferably of sheet steel, which is pressed into the desired shape, preferably in one integral piece, and I provide the cowl, so formed with means which are easily accessible, for drawing and detachably securing a removable body thereto in absolutely uniform relation, whereby the body may be detached and removed and then replaced into exactly the same relation as before removal and without disturbing or changing the engine control attachments, the steering or other accessories or devices which are carried by the cowl.

In the drawings, reference numeral 7 designates a portion of the chassis or frame of the automobile and 8 a portion of the detachable body. These may be of the usual or any preferred form or style. The cowl is designated by reference numeral 10, and in accordance with my invention is made in one integral piece or sheet of metal pressed or otherwise formed into shape. At its upper rear edge the cowl is formed into a channel or seat of substantially U-shape as indicated at 9, to form a seat for the wind shield, as clearly shown in Fig. 3.

In the form shown in Figs. 2 and 3, the front edge of the cowl is formed into a bead or molding indicated at 11, which forms an ornamental finish at the junction of the cowl with the front dash plate or part indicated at 12. This part 12, in the example shown in Figs. 2 and 3, is in the form of a pan, being pressed or shaped out of sheet metal and having an out turned flange portion 13, the cowl 10, having a coöperating flange portion 14 designed to fit upon and be welded to flange 13, the latter serving as a support to receive and hold the cowl in place. Where the cowl bead 11, is formed integrally with the cowl, that is, where the front edge of the cowl is shaped as shown in Figs. 2 and 3, into form to produce the molding 11, said edge is bent or pressed back upon itself and then outwardly to form the flange 14, and a hole or socket, indicated at 15, may be produced at the central point therein to form a bearing to receive the end of the hood hinge rod. Thus it will be seen that the pan or plate member 12, constitutes a bearing support to which the hood 10, at its front edge, is applied and to which said hood is secured by welding or otherwise, that is by welding or otherwise securing the flanges 13, 14 together.

In the form shown in Fig. 6, the front dash plate or member 16, in place of being made separate, as indicated at 12, in Fig. 3, is formed integrally with the cowl. In this case the flange bearing for the cowl is in the form of an angle plate 17, which is riveted, welded, or otherwise suitably secured to the front surface of the portion 16 of the cowl. In this case, the molding 18, is made in a separate piece, being pressed into shape out of sheet steel, and secured, by welding or otherwise, respectively to the surface of the flange member 17 and the dash plate portion 16 of the cowl, as clearly indicated.

If desired and in order to strengthen and stiffen the cowl structure, pressed steel side ribs 19, are employed around which the cowl is welded. These side ribs form strengthening means to secure rigidity of the cowl structure.

In Figs. 3 and 5, means for securing the body of the automobile to the cowl are shown. It will be understood that the points at which the automobile body and the cowl side edges come together are inaccessible for adjustment of the two parts with reference to each other on account of the limited space within which the connections must be located. Ordinarily this renders the task of disconnecting, removing or applying a body to the cowl, difficult of attainment. In accordance with the principles of my invention, I propose to provide the front end of the automobile body, at the sides thereof where the body is to be brought into engaging relation with reference to the cowl, with a permanent stud, indicated at 20. These studs are exteriorly threaded and they extend forwardly of the automobile body side portions 8. Arranged in line with the threaded stud 20, are adjusting bolts or nuts 21, carried by the cowl. These adjusting bolts are provided with interiorly threaded sockets 24. In order to render the parts accessible and convenient for adjustment, I employ stud bolts 21, of extended length and support the same in suitable or convenient struts, indicated at 22, so that the adjusting stud bolts 21 may be supported in constant uniform relation and alinement with reference to the threaded bolts 20, of the automobile body portion 8. By extending the length of the adjusting stud bolts 21, I am enabled to bring the head 23, thereof, into sufficiently accessible and convenient position to be manipulated easily and readily, by the application of a wrench or other suitable tool thereto. The threaded socket portion 24 of the stud bolts 21, are designed to be screwed onto the extended threaded ends of the bolts or studs 20, which are permanently secured to or carried by the side portions of the automobile body 8.

By this construction it will be seen that the automobile body may be detached from the cowl portion by simply backing off the securing stud bolts 21. Similarly, the automobile body may be secured and drawn up tight against the cowl, when it is desired to replace the same by simply bringing the bolts 20, into engaging relation with reference to the socket portions 24 of the stud bolts 21, and then screwing or turning up on the stud bolts 21, thereby drawing the automobile body finally and securely into place against the rear portion or the side of the cowl. This insures a constant and uniform relation of the body and cowl when adjusted and secured together in place without disturbing the relation of the associated parts. It also enables the body of the automobile to be detached and removed without in any manner disturbing members or mechanisms carried by the cowl, and whenever the body is again applied in place, it is always brought into fixed and definite relation with reference to the cowl. These are most desirable considerations and the attainment thereof is among the important elements and features of my invention. It will also be seen that the adjusting and securing means for securing the body and the cowl together are rendered easily accessible for convenient manipulation.

Having now set forth the objects and nature of my invention and constructions embodying the principles thereof, what I claim as new and useful, and of my own invention, and desire to secure by Letters Patent is:—

1. The combination with a cowl and a body for an automobile, said cowl and body being made separable, one of said parts having a threaded securing stud and the other an elongated adjusting stud bolt, said bolt said stud coöperating to detachably draw and hold the members together in adjusted relation.

2. The combination with the cowl and body portions of an automobile, said members being made separable, one of said members having a threaded stud bolt and the other a coöperating adjusting stud nut, said bolt and nut arranged to be held in definite relation to each other for securing the parts together, the nut being elongated to enable the same to be rendered accessible for adjustment.

3. The combination with a cowl and body portions of an automobile, these members being made separable, of supporting struts mounted in the sides of one of the members, elongated adjusting stud nuts supported in said struts and a threaded stud carried by the other of said members for coöperation with said nut for adjusting and detachably securing the parts together in uniform relation to each other.

4. The combination with a chassis frame, a cowl permanently mounted on said chassis frame, a body removably mounted on said chassis frame, and connections between the cowl and body for adjusting said body toward and from the cowl.

In testimony whereof I have hereunto set my hand in the presence of the subscribing witnesses, on this 14th day of February, A. D. 1913.

JOSEPH LEDWINKA.

Witnesses:
S. K. THOMPSON,
J. MARMION.